(12) United States Patent
Kashyap

(10) Patent No.: US 7,045,702 B2
(45) Date of Patent: May 16, 2006

(54) SOLAR-PANELED WINDMILL

(76) Inventor: Ravindra Kashyap, 225 79th St., Brooklyn, NY (US) 11209

( * ) Notice: Subject to any disclaimer, the term of this patent is extended or adjusted under 35 U.S.C. 154(b) by 243 days.

(21) Appl. No.: 10/392,603

(22) Filed: Mar. 19, 2003

(65) Prior Publication Data

US 2003/0230333 A1    Dec. 18, 2003

Related U.S. Application Data

(60) Provisional application No. 60/365,747, filed on Mar. 19, 2002.

(51) Int. Cl.
*H01L 31/042* (2006.01)
*F03D 11/00* (2006.01)
*H02N 6/00* (2006.01)

(52) U.S. Cl. .............. 136/244; 136/251; 136/248; 136/291; 290/55; 290/44; 60/641.8; 60/398; 310/303; 310/10; 416/3; 416/23; 416/5

(58) Field of Classification Search .............. 136/244, 136/251, 248, 291; 290/55, 44; 60/641.8, 60/398; 310/303, 10; 416/3, 23, 5
See application file for complete search history.

(56) References Cited

U.S. PATENT DOCUMENTS

| | | | | |
|---|---|---|---|---|
| 2,599,690 A | * | 6/1952 | Buivid et al. ............ | 416/114 |
| 3,540,680 A | * | 11/1970 | Peterson ............... | 244/17.19 |
| 4,355,195 A | * | 10/1982 | Sansbury .............. | 136/254 |
| 4,551,631 A | * | 11/1985 | Trigilio ............... | 290/55 |
| 5,009,243 A | * | 4/1991 | Barker ................ | 136/246 |
| 5,075,564 A | * | 12/1991 | Hickey ................ | 290/55 |
| 5,254,876 A | * | 10/1993 | Hickey ................ | 290/55 |
| 5,394,016 A | * | 2/1995 | Hickey ................ | 290/55 |
| 5,413,293 A | * | 5/1995 | Gomberg et al. ......... | 244/166 |
| 5,671,051 A | * | 9/1997 | Wright, Jr. ............ | 356/614 |
| 6,616,402 B1 | * | 9/2003 | Selsam ................ | 415/3.1 |

FOREIGN PATENT DOCUMENTS

| | | | | |
|---|---|---|---|---|
| JP | 61-203836 A | * | 9/1986 | |
| JP | 62-105482 A | * | 5/1987 | |
| JP | 3-262800 A | * | 11/1991 | |
| JP | 6-85301 A | * | 3/1994 | |
| JP | 6-167269 A | * | 6/1994 | |
| JP | 2001-73926 A | * | 3/2001 | |

* cited by examiner

Primary Examiner—Alan Diamond
(74) Attorney, Agent, or Firm—Carter, Deluca, Farrell & Schmidt, LLP

(57) ABSTRACT

A solar-paneled windmill is provided having aerodynamic fan blades provided with solar panels. The windmill produces electricity using wind energy and solar energy. In another embodiment, magnets are provided to the solar-paneled windmill fan blades to generate magnetic fields to increase the amount of electrical energy produced.

16 Claims, 5 Drawing Sheets

SOLAR-PANELED WINDMILL

PRIORITY

This application claims priority to a U.S. Provisional Application filed on Mar. 19, 2002 and assigned U.S. Provisional Application No. 60/365,747, the contents of which are incorporated herein by reference.

BACKGROUND OF THE INVENTION

1. Field of the Invention

The present invention relates to a solar-paneled windmill for producing electrical energy using wind and solar energy.

2. Description of the Related Art

Many windmills operate without any input from solar energy that is freely available. The current invention uses wind and solar energy to produce electrical energy. Additionally, in another embodiment, well-placed magnets around solar-paneled windmill fan blades yield additional electrical energy output.

SUMMARY OF THE INVENTION

The present invention is a solar-paneled windmill (SPWM), where aerodynamic windmill fan blades are made from solar cells and solar panels. Advantageously, this embodiment improves upon existing windmill technology whereby solar panels and windmill are part of the same apparatus. This SPWM windmill will generate electricity from wind power generator and, from the solar-paneled windmill fan blades. (The DC electrical energy generated from solar cells can recharge a battery or be used to increase the magnetic field strength of the magnets inside the windmill power generator.) In this embodiment electric power generation also comes from acceleration of the photoelectrons in the photovoltaic cell due to rotational motion of the solar cells. More so, the presence of magnetic fields around the windmill solar fan blades will manufacture electricity due to "Faraday's Law of Electromotive Induction" and furthermore, three sets of solar windmill fan blades which point in all three spatial axial (x, y, & z) will capture even more wind force and energy from every direction. Whence augmenting total electrical output of the solar-paneled windmill system.

BRIEF DESCRIPTION OF THE DRAWING FIGURES

The invention will be described in greater detail with reference to the accompanying drawings in which like elements bear like reference numerals, and wherein.

DETAILED DESCRIPTION OF PREFERRED EMBODIMENTS

A preferred embodiment is as follows: an aluminum sheet 10 or some other metallic sheet, is cut in a fashion of an aerodynamic windmill fan blade. Two nylon sheaths 20 or some other insulating materials are glued on either side of the aerodynamic windmill fan blade made of aluminum sheet 10, see FIG. 1. The photovoltaic solar cells 30 are cut so that it can properly fit onto the nylon glued to aluminum aerodynamic windmill fan blades, see FIG. 1. Then these solar cells 30 are soldered and attached to the metallic tab ribbons 40, see FIG. 1.

Figure 1:
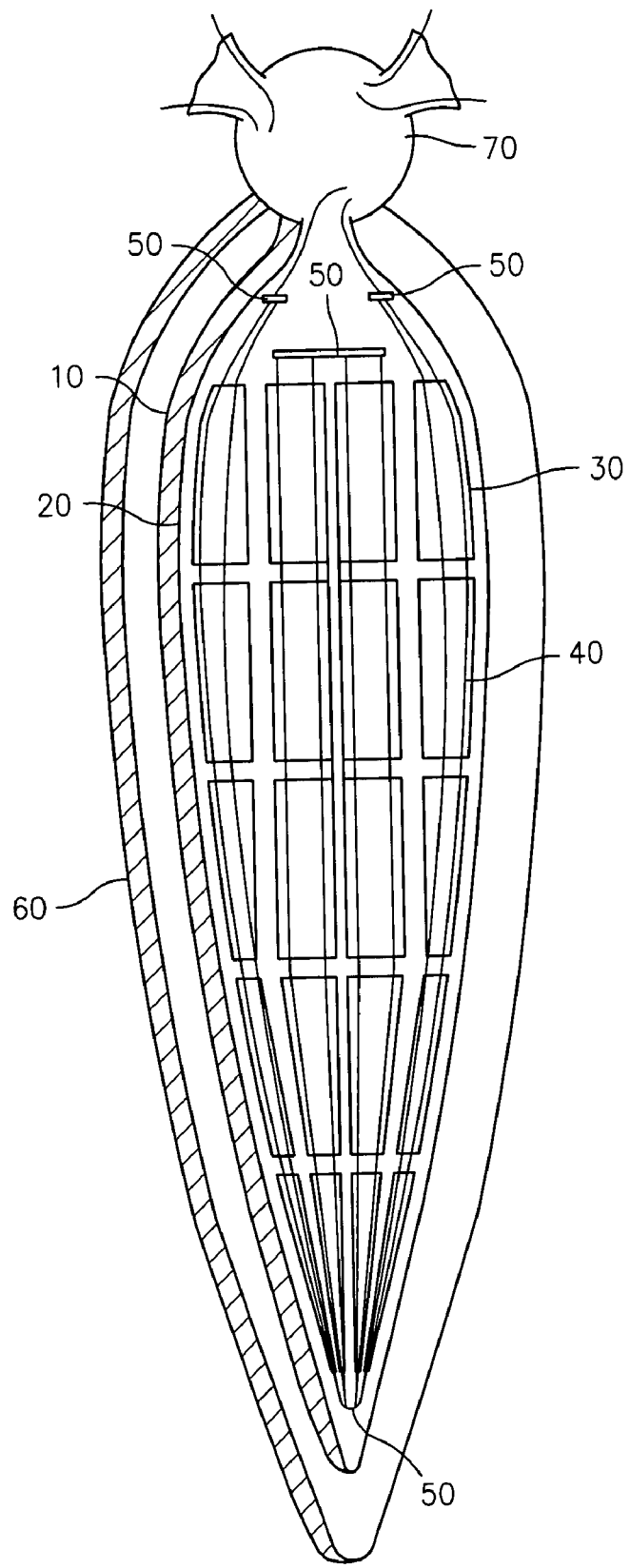
FIG. 1 is a schematic showing a making of a solar-paneled windmill fan blade, where assembled photovoltaic solar cells, tab ribbons, bus ribbons, are glued on nylon (or any another insulator), which is subsequently glued onto aluminum (or any another metal) base; and, Plexiglas (or transparent plastic) on top provides a complete all weather protective covering seal.

In this embodiment the photovoltaic solar cells 30 are arranged in series type of electrical connection to increase voltage output, see FIG. 1. (Note parallel type electrical connection of the solar cells can also be done to increase amperage yield.) (Furthermore, note that "movement kinetic cells" that generate electrical energy when these kind of cells are in motion can be placed on the windmill fan blades instead of solar cells.) Some of the tab ribbons 40 are soldered onto the back of the solar cells 30, which represent the positive side of the solar cell.

Other tab ribbons 40 are soldered onto the face up negative side of the solar cells 30. As shown in FIG. 1, these tab ribbons 40 connect all the solar cells 30 in series and then these tab ribbons 40 are soldered to the metallic bus ribbons 50 that are just bigger size tab ribbons, see FIG. 1. One bus ribbon 50 only connects with those tab ribbons 40 that are connected to the positive side of all the solar cells 30 in series. And other bus ribbons 50 connect with tab ribbons 40 of the negative face up side of all the solar cells 30 in series.

Figure 2:
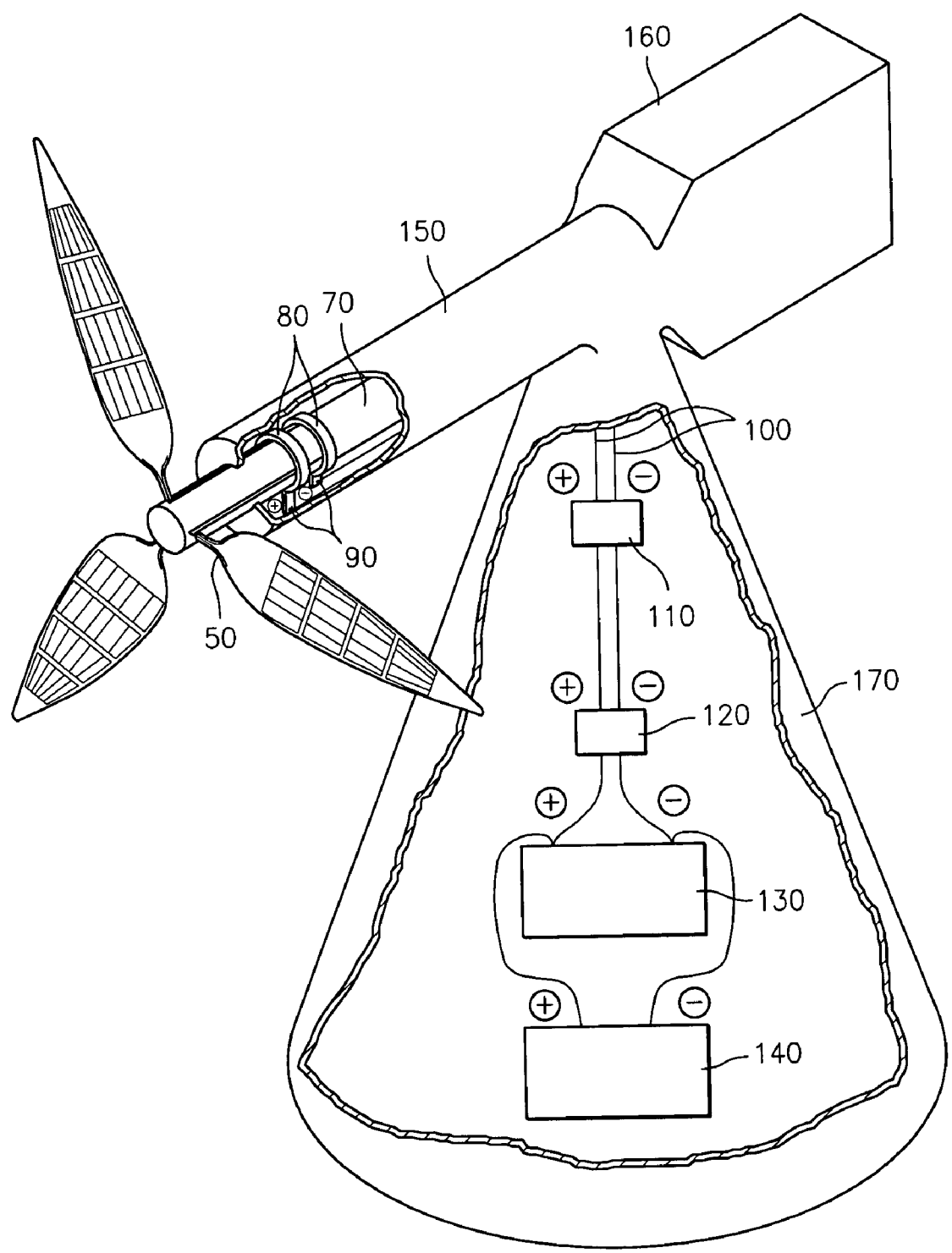
FIG. 2 is a schematic showing a windmill that has a solar-paneled fan blade.

These two, negative and positive bus ribbons 50, exit at the top of the solar-paneled aerodynamic windmill fan blades and attaches to the inner wall of the windmill axel/shaft rod 70, see FIGS. 1 and 2. Two configurations of the solar cells 30, with soldered tab ribbons 40, and bus ribbons 50 is custom fitted onto the windmill fan blades and permanently glued on the either side of the fan blade which itself is composed of glued nylon (insulator) and aluminum (metal) material, and altogether they create the solar-paneled windmill fan blade 1.

Then the assembled solar-paneled windmill fan blades 1 will be covered with thin cut windmill fan blade configuration Plexiglas 60 material (or some other hard transparent thin plastic.) The two Plexiglass members 60 will be attached to each other from either side of the solar-paneled windmill fan blades 1, see FIG. 1. The Plexiglas covering each side of the solar windmill fan blades will be permanently sealed airtight with clear silicon rubber caulking so that water, snow, and dust etc, will not be able to get inside the fan blades to damage the solar panels, see FIG. 1. Hence under all weather condition the solar-paneled windmill fan blades 1 will be protected.

A given aerodynamic solar-paneled windmill fan blade 1 will have two pairs or four bus ribbons 50 coming out and attaching onto the inner wall of the axel/shaft 70, see FIG. 2. These bus ribbons 50 are soldered onto the collector rings 80, see FIG. 2. Note that negative and positive lines of the bus ribbons 50 attach to the negative and positive ends of the collector rings 50, see FIG. 2. The collector rings 80 are permanently attached to the axel/shaft 70 and also articulate with the conducting brushes 90 to which the negative and positive wires 100 issue out, see FIG. 2. These wires 100 straddle and attach to the inner wall of the hard and static outer protective covering 150, and then the wires 100 attach to the junction box 110 that sits inside the windmill holder pole 170, see FIG. 2. From the junction box 110 the negative and positive wires 100 attach to a diode 120, see FIG. 2. From the diode 120, the negative and positive wires 100 attach to a rechargeable battery 130 see FIG. 2. And from the battery 130, the wires 100 could be attached to an inverter 140, see FIG. 2.

The wind turns the axel/shaft 70 attached to the windmill power generator 160 to produce electricity. The advantage and improvement that this embodiment offers is that the solar panels and windmill are stationed in the same apparatus. Thus, solar energy via the process of photoelectric effect is converted to Direct Current electrical energy in the photovoltaic cells that will travel down the tab ribbons 40 onto the bus ribbons 50. Then this direct current will travel from the bus ribbons 50 to the shaft 70 and its collector rings 80 and then go through the brushes 90.

From here on the DC current goes through the negative and positive wire 100 to the junction box 110 to the diode 120, and finally ends up charging the rechargeable battery 130. The diode 120 prevents discharge of the battery when solar energy is not available during nighttime. From the battery 130, the wire can go on to connect to an inverter 140, if AC current is required as output instead of DC. Note that the junction box 110, diode 120, rechargeable battery 130, and inverter 140, all are housed inside the windmill holder pole 170, see FIG. 2. Moreover, the photoelectric effect which causes photoelectrons of the photoelectric cells 30 to eject and jump into higher quantum states together with the rotating solar cells due to wind, causes the photoelectrons to accelerate, thus producing additional electrical energy.

Figure 3:
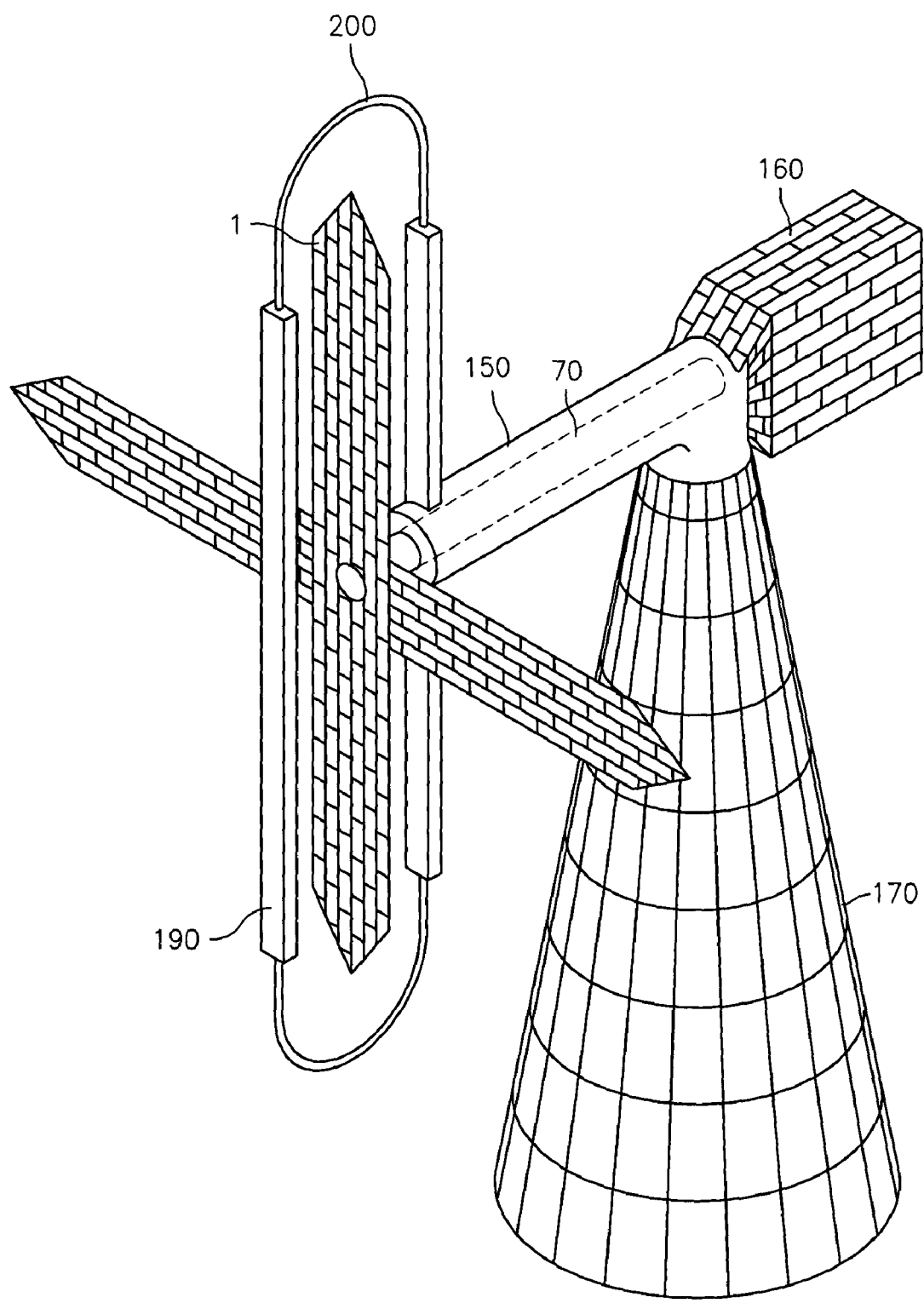
FIG. 3 is a schematic showing a windmill that has solar-paneled fan blade with magnets running parallel to the fan blades.
Figure 4:
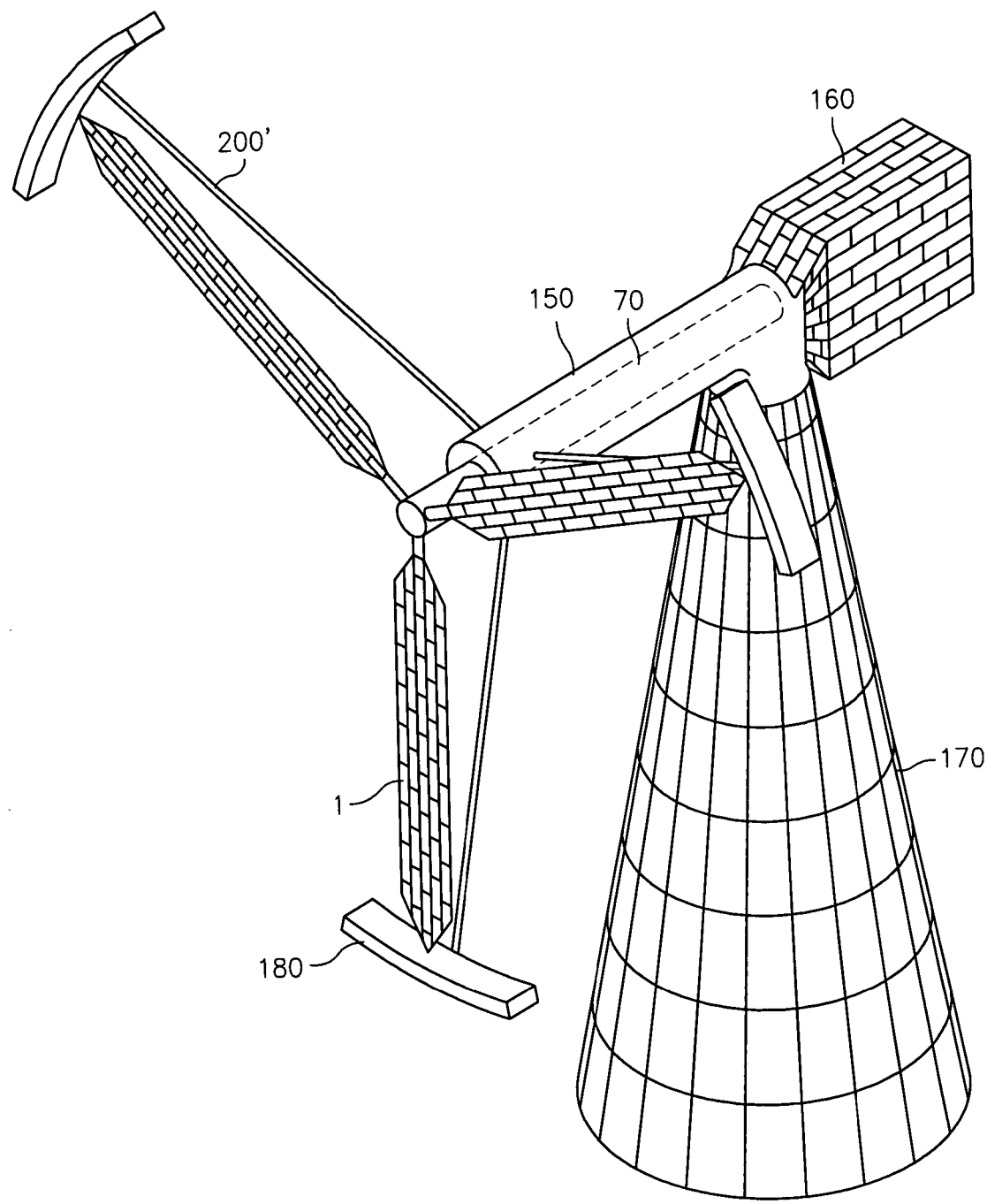
FIG. 4 is a schematic showing a windmill that has solar-paneled fan blade with magnets along the circumferential (or perpendicular) aspect of the solar fan blades.

In addition, parallel external magnets 190 as shown in FIG. 3 and perpendicular magnets 180 as shown in FIG. 4, which are respectively supported by support members 200 and 200', are placed outside the solar-paneled windmill blades 1 to create magnetic fields perpendicular and parallel, respectively, to the solar-paneled fan blades 1 can further augment electrical energy production in this current embodiment. A hard hollow metallic or plastic non-rotating outer protective covering 150 that not only houses the axel/shaft 70, collector rings 80, brushes 90, and wires 100 but on its 150 outside top circumference a perpendicularly emerging hard solid and stable rod-like support structure is attached that will contain and house the permanent magnets 190 and 180 as shown in FIG. 3 and FIG 4.

Figure 5:
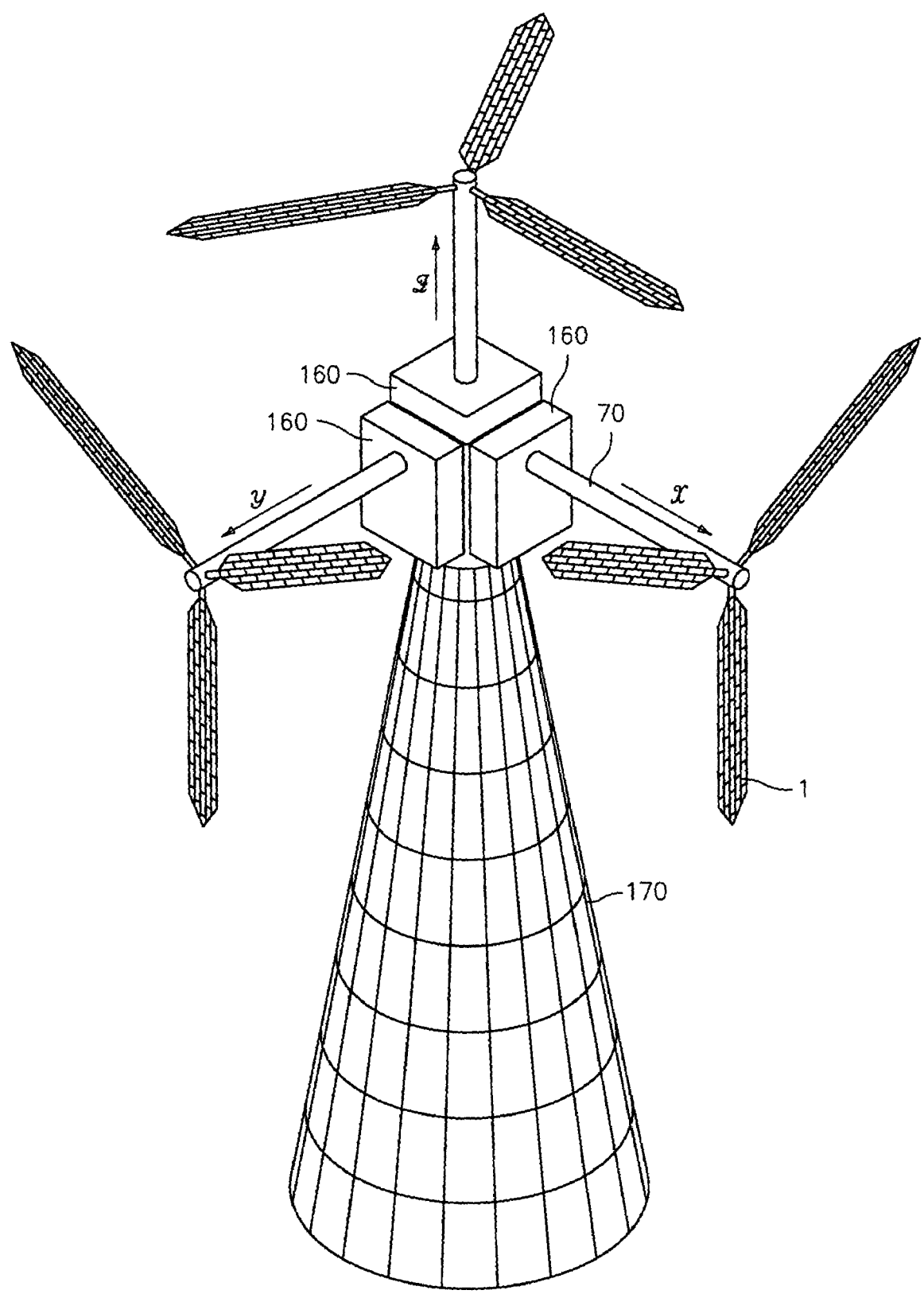
FIG. 5 is a schematic showing three solar-paneled windmills that are positioned such that each of them face each of the three Euclidean spatial coordinate axis x, y, and z.

The rotating solar-paneled windmill fan blades 1 cut the magnetic fields of the magnets 190 and 180. And this interaction of these stationary magnetic fields with the rotating and moving metallic tab ribbons 40 and bus ribbons 50 as well as with the emerging photoelectrons in the photoelectric cells generate electricity in this current embodiment; this happens by virtue of Faraday's Law of electromagnetic induction which states that a changing flux of magnetic fields near a wire or a conductor will generate an electric field and an electromotive force. (Another way to further augment electrical energy production is to design within a single windmill apparatus, three sets of solar-paneled windmill fan blades whose axel/shaft 70 point in all three spatial coordinates axis x, y, & z and each of these sets of solar-paneled windmill fan blades have their own separate windmill power generators, batteries and magnets etc, see FIG. 5.)

Wind energy that turns the axel/shaft 70 through the rotational motion of the solar-paneled windmill fan blades 1 operates on the windmill power generator 160 to generate electricity. Second, the solar energy through the photoelectric effect of the photovoltaic cells 30 will generate electricity. Note that the electrical output from the solar energy could be used to induce and enhance the magnetic field strength inside the windmill power generator 160.) Third, the magnetic fields present outside of the solar-paneled windmill fan blades 1 and a rotating conductor such as the bus and tab ribbons of the solar-paneled windmill fan blades 1 will provide electricity by Faraday's Law of Electromotive Induction.

Fourth, the interaction of the magnetic fields with the conducting photoelectrons produced by solar energy on the photovoltaic cells will further yield electricity. Fifth, the rotational motion of the solar cells fan blades due to wind can accelerate photoelectrons (produced by the photoelectric effect) to yield additional electrical energy. And sixth, by placing three sets of solar-paneled windmill fan blades and its axel/shaft 70 to point separately and independently in each of the three spatial coordinates axis (x, y, & z), will cause maximum capture of the wind force and its energy from all possible wind direction, and subsequently, since wind energy is converted to electrical energy by the windmill power generator 160, further electricity production is garnered, see FIG. 5.

It will be further apparent to one skilled in this art that the improvements provided for in the present invention, while described with relation to certain specific physical embodiments also lend themselves to being applied in another physical arrangements not specifically provided for herein, which are nonetheless within the spirit and scope of the invention taught here.

The invention claimed is:

1. An apparatus for generating electricity by combining the effects of wind and solar energies, said apparatus comprising:

at least one blade being rotational with respect to a central point upon the application of wind energy to said at least one blade;

at least one solar cell provided on said at least one blade;

at least two magnets each located at a non-contact distance from said at least one blade and at an opposite side of said at least one blade with respect to each other, said at least two magnets configured to create a magnetic field with respect to said at least one blade; and an electro-mechanical mechanism for converting kinetic energy due to the rotation of said at least one blade and solar energy impinging on said at least one solar cell into electrical energy, wherein the rotation of said at least one blade having said at least one solar cell provided thereon increases the amount of electrical energy produced compared to non-rotation of said at least one blade.

2. The apparatus according to claim 1, wherein said at least one blade intercepts the magnetic field during rotation thereof.

3. The apparatus according to claim 1, further comprising at least two support members for supporting said at least two magnets at the non-contact distance from said at least one blade.

4. The apparatus according to claim 1, wherein said at least two magnets are oriented parallel to said at least one blade.

5. The apparatus according to claim 1, wherein said at least two magnets are oriented perpendicular to said at least one blade.

6. The apparatus according to claim 1, wherein said at least one blade includes two blades.

7. The apparatus according to claim 6, wherein said two blades are oriented perpendicular with respect to each other.

8. The apparatus according to claim 1, wherein said at least one blade includes three blades.

9. The apparatus according to claim 8, wherein said three blades are oriented at approximately 120 degrees with respect to each other.

10. A method for generating electricity by combining the effects of wind and solar energies, said method comprising:
 providing at least one blade being rotational with respect to a central point upon the application of wind energy to said at least one blade;
 providing at least one solar cell on said at least one blade;
 providing at least two magnets at a non-contact distance from said at least one blade and each at an opposite side with respect to said at least one blade, said at least two magnets configured to create a magnetic field with respect to said at least one blade; and
 providing an electro-mechanical mechanism fat converting kinetic energy due to the rotation of said at least one blade and solar energy impinging on said at least one solar cell into electrical energy, wherein the rotation of said at least one blade having said at least one solar cell provided thereon increases the amount of electrical energy produced compared to non-rotation of said at least one blade.

11. The method according to claim 10, wherein said at least one blade intercepts the magnetic field during rotation thereof.

12. The method according to claim 10, wherein said at least two magnets are oriented one of parallel and perpendicular to said at least one blade.

13. The method according to claim 10, wherein said at least one blade includes two blades.

14. The method according to claim 13, wherein said two blades are oriented perpendicular with respect to each other.

15. The method according to claim 10, wherein said at least one blade includes three blades.

16. The method according to claim 15, wherein said three blades are oriented at approximately 120 degrees with respect to each other.

* * * * *